Figure 1:
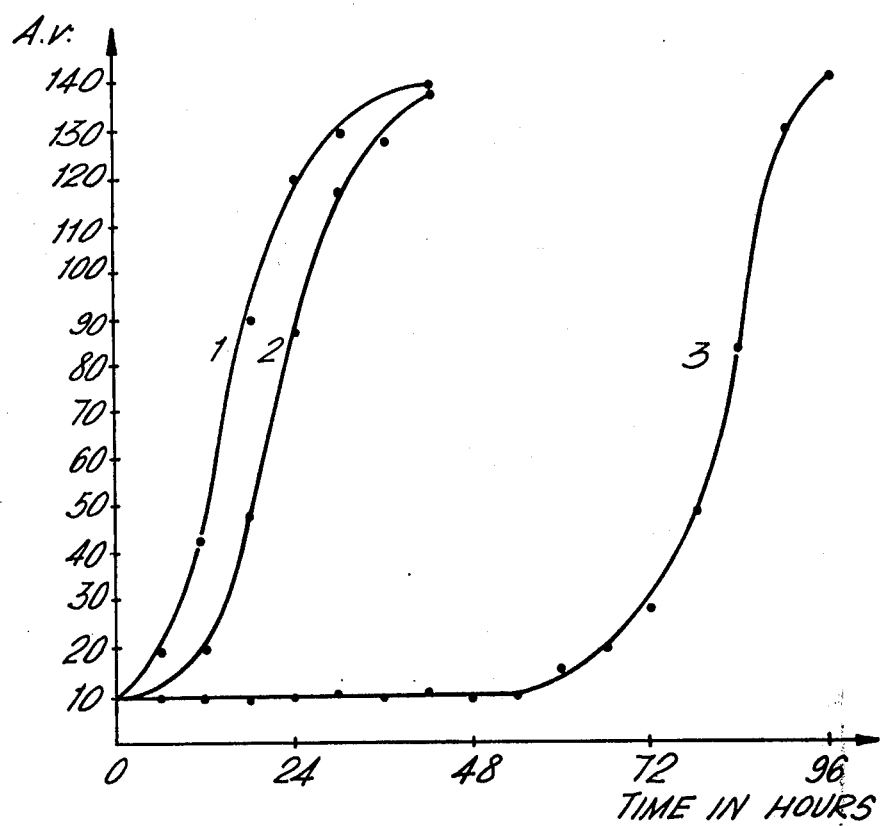

United States Patent [19]

Hall

[11] 4,061,568

[45] Dec. 6, 1977

[54] METHOD FOR RECOVERING AND STABILIZING FAT AND FATTY SUBSTANCES AS WELL AS PROTEINS AND PROTEINOUS SUBSTANCES FROM PROCESS WATER

[75] Inventor: Gunnar Hall, Oslo, Norway

[73] Assignee: A/S Apothekernes Laboratorium for Specialpraeparater, Oslo, Norway

[21] Appl. No.: 641,594

[22] Filed: Dec. 16, 1975

Related U.S. Application Data

[63] Continuation-in-part of Ser. No. 440,574, Feb. 2, 1974, abandoned.

[30] Foreign Application Priority Data

Feb. 9, 1973 Norway ................................. 73539

[51] Int. Cl.² ............................................. C02B 1/20
[52] U.S. Cl. ...................................... 210/44; 210/51; 210/53; 260/112 R; 260/412.5
[58] Field of Search ..................... 210/42, 44, 52, 53, 210/56; 260/112 R, 112 B, 412.5

[56] References Cited

U.S. PATENT DOCUMENTS

| | | | |
|---|---|---|---|
| 966,196 | 8/1910 | Goodman | 210/52 |
| 2,204,703 | 6/1940 | Sanders | 260/112 R |
| 2,277,718 | 3/1942 | Sander | 210/56 |
| 2,328,361 | 8/1943 | Sanders | 210/56 |
| 3,314,880 | 4/1967 | Rubin | 210/44 |
| 3,491,080 | 1/1970 | Ehrensvärd | 260/112 R |
| 3,738,933 | 6/1973 | Hollo et al. | 210/53 |
| 3,898,160 | 8/1975 | Finley | 210/53 |
| 3,936,375 | 2/1976 | Nettli | 210/52 |
| 3,974,069 | 8/1976 | Nettli | 210/52 |

Primary Examiner—Wilbur L. Bascomb, Jr.
Assistant Examiner—Peter A. Hruskoci
Attorney, Agent, or Firm—Haseltine, Lake & Waters

[57] ABSTRACT

The invention according to the present patent application relates to a method for recovering substances from fat processing industry such as fat refining plants, margarine industry and other food industries, whereby a water purifying effect is achieved as well as increased stability of the recovered substances.

3 Claims, 5 Drawing Figures

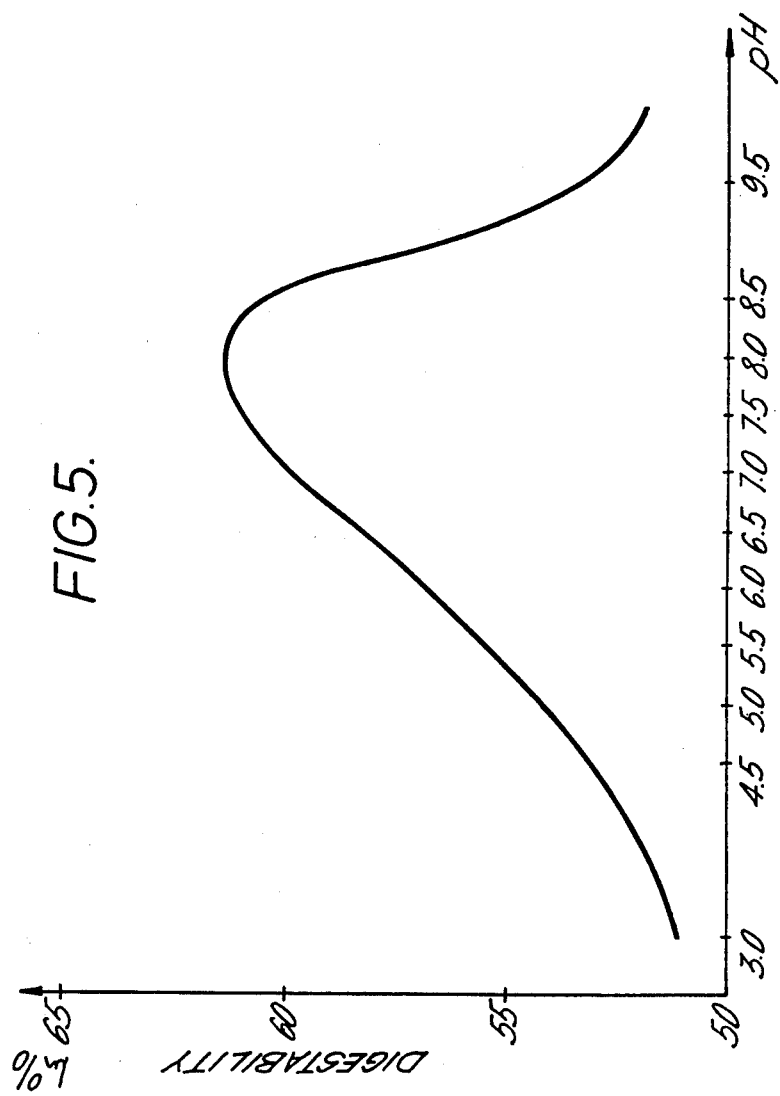

METHOD FOR RECOVERING AND STABILIZING FAT AND FATTY SUBSTANCES AS WELL AS PROTEINS AND PROTEINOUS SUBSTANCES FROM PROCESS WATER

This is a continuation-in-part application of copending U.S. Pat. application Ser. No. 440,574 filed Feb. 2, 1974 now abandoned.

Process water and effluent from the food industry often contain large quantities of fat, fatty substances, proteins and proteinous substances representing a not inconsiderable potential value. Said substances also contribute substantially to the pollution, since they are easily aerobically decomposed and disrupt the oxygen balance in recipients.

The invention according to the present patent application relates to a method for recovering substances from fat processing industry such as fat refining plants, margarine industry and other food industries, whereby a water purifying effect is achieved as well as increased stability of the recovered substances.

It is known that e.g. acid hydrolyzing metal salts, e.g. $Fe^{3+}$ and $Al^{3+}$ salts, can be used as flocculation agents. Furthermore, it is known that these salts also have a disemulgating effect as well as an effect to cause a break up of colloidal protein systems. The disadvantage of using these kinds of salts in connection with said effluent is that they act as catalysts for the auto oxidation of fatty substances and thus reduce the value of these substances as a recovered material, since ketones, peroxides and aldehydes are formed.

According to the method of the present invention an acid hydrolyzing metal salt, e.g. a $Fe^{3+}$ salt, is used to form a complex compound with the fatty substances. After thorough mixing and a sufficient reaction time an alkaline earth hydroxide, e.g. $Ca(OH)_2$, is added, whereafter the complex is precipitated as a co-precipitate which can be separated by sedimentation, centrifugation or flotation as a sludge. This co-precipitate, e.g. Fe-fat-Ca, is insoluble by addition of a strong mineral acid at room temperature, which clearly indicates that it is not a question of precipitated metal hydroxides, but of an acid insoluble co-precipitate.

It is provable that the sludge has considerably greater stability than e.g. a $Fe(OH)_3$-fat-sludge, where fat is adsorbed, indicating that the catalytic effect of the metal ion is inhibited, possibly by chelation, cf. diagrams to the Examples 1, 2 and 3 — FIGS. 1–4.

In process water from the food industry fat and proteins occur in varying ratios. If the amount of proteins is substantial in relation that of fat, i.e., more than 10% of the total amount of solids in the process water, it may be necessary to reduce the pH below 4 with a mineral acid before, simultaneously or after the addition of the acid hydrolyzing metal salt. This proves to be quite necessary for an effective complex formation with water soluble proteins, but it is less necessary for colloidal proteins/fat-containing effluent. After the addition of the alkaline earth hydroxide, the complex is precipitated as a co-precipitate which can be separated by sedimentation, centrifugation or flotation, and the sludge is insoluble when strong mineral acid is added. This sludge can be of great value e.g. in fodder mixtures, where it is important to avoid oxidation products of fat, which have proved to be toxic.

A complex precipitation of the proteins as carried out according to the present invention upon subsequent heat treatment and drying also provides an improved digestability as compared with acid precipitated proteins, because the precipitation of the complex occurs in a neutral pH range. Cf. the diagram of digestability v.s. pH, cf. FIG. 5.

Instead of using an alkaline earth hydroxide, it is also possible to use an alkali hydroxide in the method according to the present invention, if sufficient alkaline earth salt is already present.

In many cases it is necessary for separation by flotation that an anionic poly-electrolyte is added after the alkaline earth hydroxide. In most cases flotation will be the principle of actual interest, since said treatment can provide a sludge concentration of 15% or more.

EXAMPLE 1

The untreated effluent from a margarine factory (pH 7.4) was treated in the test. The following three comparative tests were carried out:

1. The effluent content of fat was separated by micro flotation, i.e., by addition of air saturated water at a pressure of 4 atms. The recovery is shown in Table 1. The flotated fat was used in the auto oxidation test.

2. The effluent was treated with 90 ppm iron (III) chloride reducing the pH to 6.2 and 100 ppm lime was added, raising the pH to 7.5, in accordance with the prior art technique. By this treatment flocks were formed which were floated in the above-mentioned manner. The sludge was later scraped off and used in the auto oxidation test. The recovery is shown in Table 1.

3. The effluent was supplied with 90 ppm ferric chloride, and the pH was reduced to 3.8 by the addition of 80 ppm sulfuric acid to reduce the pH below pH=4, whereafter 180 ppm lime was added to raise the pH to 7.5. The precipitated material was flotated, and the sludge was used in the auto oxidation test. The recovery is shown in Table 1.

Table 1

| Sample | Test | Fat mg/l | Recovery in % |
|---|---|---|---|
| Natural water | — | 1780 | — |
| Effl. | 1) | 872 | 51 |
| Effl. | 2) | 157 | 91, 7 |
| Effl. | 3) | 52 | 97, 8 |

To determine the auto oxidation stability of the recovered fat as the anisidine value, determined according to the U.P.A.C. standard method, was used as a parameter.

The anisidine value discloses the fat/oil content of aldehyde compounds and other carbonyl compounds and is today used as an indicator analysis of the quality of the fat/oil. In the auto oxidation test the three sludge samples were weighed so that an equal amount of fat was obtained. The samples were then arranged on a thermostat controlled water bath 80° C ± 1° and air was bubbled through. At certain time intervals samples were taken, fat was extracted and anisidine values were measured. FIG. 1 shows the results from said auto oxidation tests.

The diagrams show that the fat content of the sludge from tests 1 and 2 was oxidized considerably faster than the fat content of the sludge from test 3, which sludge was recovered by the method according to the present invention. The tests, thus, show that the fat content of a sludge from test 3 is considerably more stable than the fat content of a sludge from the tests 1 and 2.

EXAMPLE 2

For this test untreated effluent (pH 8.1) from a tallow melting plant was used. The effluent is slightly alkaline, has a brownish color and is turbid from emulgated fat. The effluent was used in the same manner as stated in Example 1. The results from the recovery of fat are shown in Table 2.

Table 2

| Sample | Test | Fat mg/l | Recovery in % |
|---|---|---|---|
| Natural water | — | 1140 | — |
| Effl. 1) | 1 | 106 | 90,7 |
| Effl. 2) | 2 | 93 | 91,8 |
| Effl. 3) | 3 | 36 | 96,4 |

Figure 2:
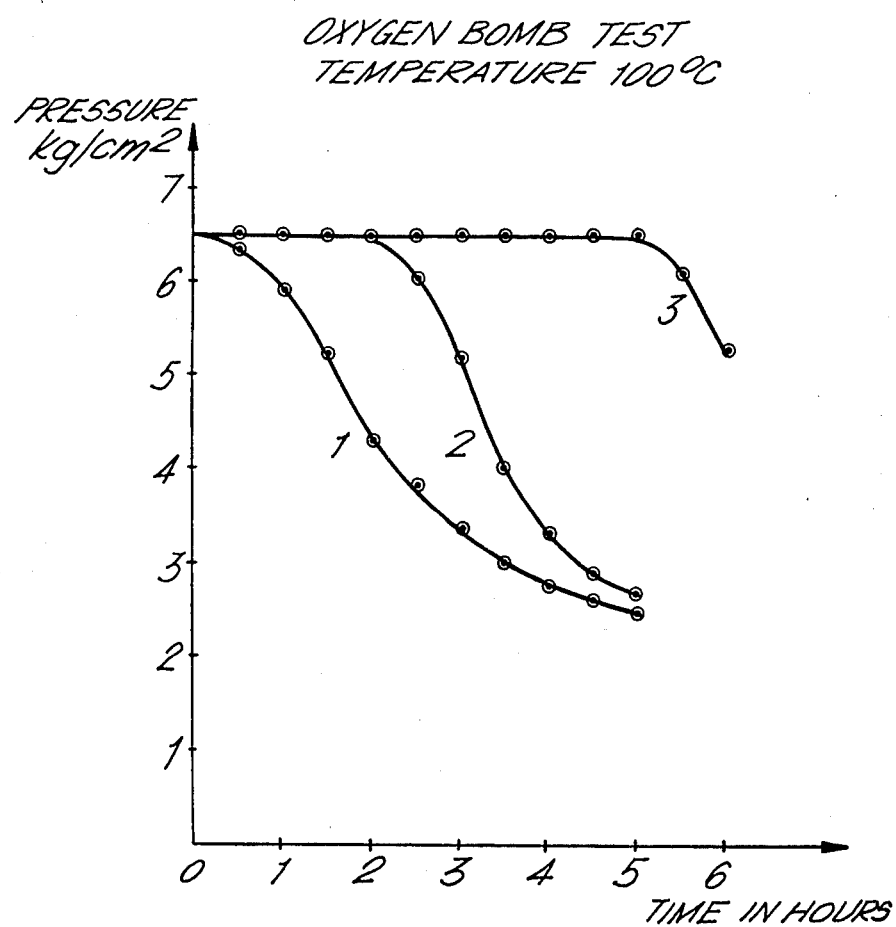

"The Oxygen Bomb Test" was used to examine the stability of the fat sludge. According to this method the sample in question is inserted in a chamber that is put under excess $O_2$- pressure. The chamber with the sample is heated to a certain temperature and the pressure reduction due to the oxygen uptake is continuously read. This analysis provides a measurement of the auto oxidation as a function of time. FIG. 2 shows the results from the tests.

The diagrams show that the fat content of a sludge from the tests 1 and 2 was oxidized considerably faster than the fat content of a sludge from test 3, which latter was recovered by the method according to the invention.

Tests 2 and 3 were run as follows:

2. The effluent was supplied with 100 ppm of ferric chloride which reduced pH to 6.4, and thereafter 90 ppm lime was added in order to raise the pH to 7.5. By this treatment, flocks were formed which were flotated and isolated as described in Example 1.

3. The effluent was supplied with 100 ppm ferric chloride which reduced the pH to 6.4, and thereafter 90 ppm or sulfuric acid was added in order to reduce the pH to 3.8. Thereafter, the pH was raised to a pH of 7.5 by the addition of 180 ppm of lime. By this treatment, flocks were formed which were treated as indicated in Example 1.

EXAMPLE 3

For this test effluent from a slaughter house where cattle and pigs were slaughtered was used. The effluent had a pH=6.8, it was colored red from blood proteins and contained suspended particles. The fat content of the effluent was low as compared to the protein content.

TESTS

1. Flocculation with iron (III) chloride. The effluent was supplied with various amounts of $FeCl_3$ and flocculated, the optimal amount being 225 ppm $FeCl_3$ which reduced the pH to 5.1.

The flocks formed were relatively stable and flotated upon addition of dispersion water (air saturated water at 4 atms). A voluminous sludge was formed. The liquid phase under the sludge was still colored red from blood proteins, and this shows that the method is not suitable for precipitation of said proteins. Suspended material, on the other hand, was effectively reduced. The results are shown in Table 3.

2. Flocculation with iron (III) chloride and lime. 225 ppm $FeCl_3$ were added to the effluent which reduced the pH to 5.1, and the pH was raised to 7.5 with 250 ppm $Ca(OH)_2$. The flocks were easily floated by addition of dispersion water, but formed a comparatively voluminous sludge. The liquid phase beneath the sludge was still colored red, and this proves that this method was not suitable for the recovery of blood proteins. The results are shown in Table 3.

3. 225 ppm of $FeCl_3$ were added to the effluent with subsequent adjustment of the pH to a pH value below 4 with 150 ppm $H_2SO_4$. After a certain mixing and reaction time 425 ppm $Ca(OH)_2$ was added to raise pH to 7.5. From this treatment stable flocks were formed, which after an addition of dispersion water, rapidly flotated to the surface and formed a relatively concentrated sludge. The liquid phase beneath the sludge was rendered clear and colorless by this treatment. The results are shown in Table 3.

Table 3

| Sample | Test | mg/l Proteins | % Recovered | mg/l Fat | % Recovered | mg/l S.S. |
|---|---|---|---|---|---|---|
| Natural water | — | 940 | — | 306 | — | 468 |
| Effl. 1 | 1 | 560 | 40,5 | 44 | 85,6 | 56 |
| Effl. 2 | 2 | 410 | 56,3 | 37 | 87,9 | 44 |
| Effl. 3 | 3 | 87 | 90,75 | 29 | 90,5 | 31 |

The three obtained sludge types contained the essential part of the fat of the effluent and examinations as to stability at auto oxidation were made.

Said three sludge types were treated as in Example 1, i.e., with heat and ample supply of air by blowing air through them. Samples were taken at various intervals of time, the peroxide value and the self extinction of the fat were measured, see FIG. 2 and 4 respectively.

Figure 3:
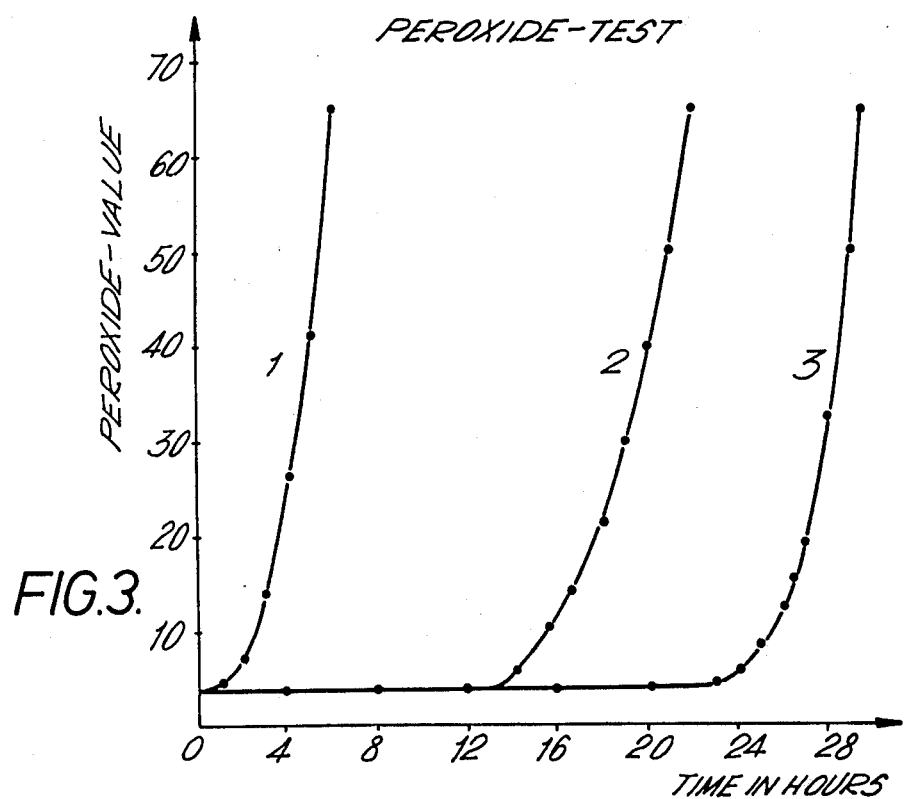

The peroxide value was determined according to the A.O.A.C. standard method and is representative for the degree of oxidation of the fat. The diagrams in FIG. 3 show that the fat content in a sludge from tests 1 and 2 oxidize considerably faster than the fat content in a sludge from test 3, which latter has been recovered by the method according to the present invention.

Figure 4:
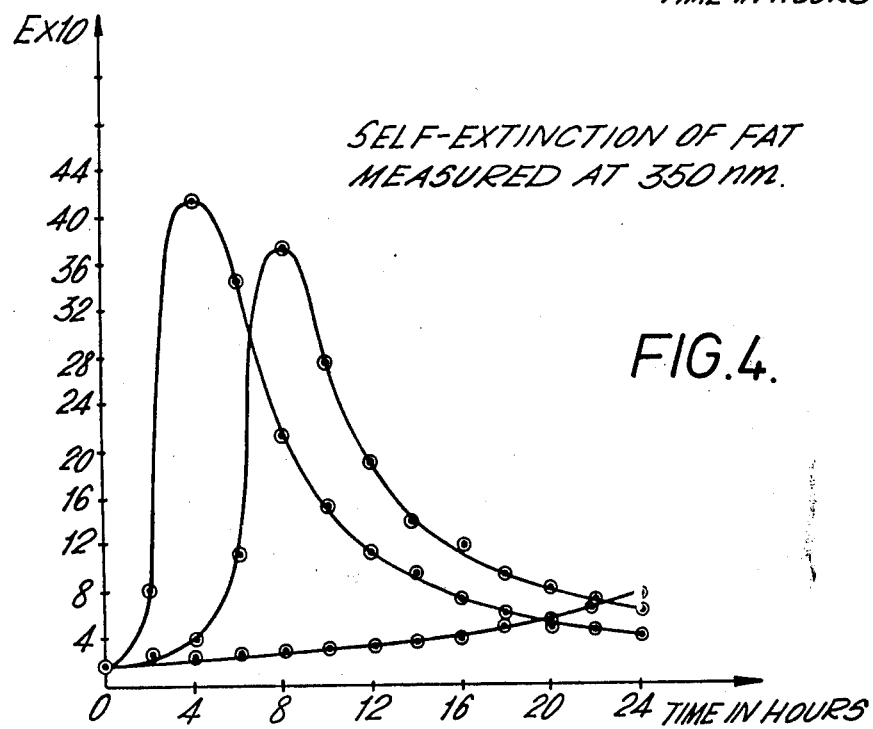

To determine the self extinction of the fat one can use the same method as for the determination of the anisidine value. Self extinction of fat is representative for the degree of oxidation of the fat and its stability, as an unstable fat will rapidly be colored, among others due to the oxidation. The diagrams in FIG. 4 show that the fat content in a sludge from the tests 1 and 2 is considerably more unstable than the fat from a sludge from test 3, which latter has been recovered by the method according to the present invention.

As regards the digestability of proteinous matter, we know from previous experiments that the pH during drying must be in the neutral area. FIG. 5 shows the percentage of digestability at different pH values during drying. The experiment gives cause for believing that the Fe-protein complex will have comparatively good digestability.

I claim:

1. A method for treatment of aqueous effluents from slaughter houses or fat refining plants, said effluent containing organic materials defined as fats, fatty substances, proteins, proteinaceous substances as well as deterioration products thereof in order to recover said organic materials in the form of a stabilized sludge, consisting essentially in the following sequential steps of (a) contacting the effluents with ions selected from the group consisting of iron and aluminum in an amount sufficient to bind, by complexing the present organic material, (b) reducing the pH to below 4 by addition of a mineral acid and mixing said effluent for a time sufficient to complex said organic material, (c) adding a compound selected from the group consisting of CaO and Ca(OH)$_2$ in an amount sufficient to raise the pH to 6–9 to coprecipitate the complexed organic material, and (d) separating said complexed organic material from said effluent as a stabilized sludge by flotation.

2. A method according to claim 1 wherein said formed complex is precipitated at a pH of 7–8.

3. A method according to claim 2 characterized in that the effluent is contacted with an ion source chosen from the group comprising ferric chloride, ferric sulfate and aluminum sulfate.

* * * * *